US006281492B1

(12) United States Patent
Almesåker

(10) Patent No.: US 6,281,492 B1
(45) Date of Patent: Aug. 28, 2001

(54) METHOD AND DEVICE FOR DIRECTING A FLUID IN MOTION

(76) Inventor: Marianne Almesåker, Vasavägen 21, S-582 20, Linköping (SE)

( * ) Notice: Subject to any disclaimer, the term of this patent is extended or adjusted under 35 U.S.C. 154(b) by 0 days.

(21) Appl. No.: 09/331,967

(22) PCT Filed: Dec. 30, 1997

(86) PCT No.: PCT/SE97/02209

§ 371 Date: Aug. 24, 1999

§ 102(e) Date: Aug. 24, 1999

(87) PCT Pub. No.: WO98/29926

PCT Pub. Date: Jul. 9, 1998

(30) Foreign Application Priority Data

Dec. 30, 1996 (SE) .................................................. 9604850

(51) Int. Cl.[7] .................................................. H01S 3/094
(52) U.S. Cl. ................. 250/251; 250/423 P; 315/111.21; 315/111.61; 313/362.1
(58) Field of Search ................................ 250/251, 423 P; 315/111.21, 111.61; 313/362.1

(56) References Cited

U.S. PATENT DOCUMENTS 3,814,983 * 6/1974 Weissfloch et al. .................. 315/39
4,016,417 * 4/1977 Benton ................................. 250/251

FOREIGN PATENT DOCUMENTS 2677133 12/1992 (FR) .

OTHER PUBLICATIONS

S. C. Gaur et al., Indian Journal of Purc & Applied Physics, vol. 8, Feb. 1970, pp. 86–pp. 89.
Normal Kroll et al., Physical Review A, vol. 5, No. 4, Apr. 1972, p. 1883–p. 1905.

* cited by examiner

*Primary Examiner*—Bruce C. Anderson
*Assistant Examiner*—Nikita Wells

(57) ABSTRACT

In order to make it possible to direct fluids in motion such as a sound wave motion without any mechanical means of guidance, it is proposed a method and a device capable of directing the fluid in motion by using a curtain (10) of electromagnetic radiation for exciting the fluid (14) at the curtain to form a fluid directional layer (16) in the fluid.

14 Claims, 5 Drawing Sheets

METHOD AND DEVICE FOR DIRECTING A FLUID IN MOTION

This application is the national phase under 35 U.S.C. §371 of PCT International Application No. PCT/SE97/02209 which has an international filing date of Dec. 30, 1997 which designated the United States of America.

BACKGROUND OF THE INVENTION

The present invention relates to a method and a device for directing a fluid in motion.

As opposed to electromagnetic wave radiation, such as laser radiation, there are no effective ways to direct, or channel fluids or wave propagation in fluids without using any mechanical means such as tubing accompanying and enclosing the propagating fluid.

The object of the present invention is therefore to provide a method and a device, which makes it at least partially possible to enclose or direct fluids in motion such as sound wave motion without any mechanical means of guidance.

This is obtained by the features given in the appended claims.

SUMMARY OF THE INVENTION

The invention is the result of the discovery by the inventor that particularly collimated and coherent electromagnetic radiation appears to have the ability to shield or direct, such as guide, deflect or reflect a fluid such as air in motion. Tests conducted by the inventor using low energy laser radiation and audible sound emitted in the direction of laser radiation resulted in an appreciable higher level of sound measured at certain distances and orientations from the laser radiation than at other distances and orientations from the laser radiation, indicating fluid shielding or directional properties of laser radiation. While the physical and chemical mechanisms governing this supposed ability of electromagnetic radiation are not yet fully understood, it is assumed that electromagnetic radiation along its path, depending on its intensity or energy, forms a boundarylayer in the fluid. In the boundary layer the electromagnetic radiation is assumed to excite and ionize the adjacent molecules of the fluid, possibly into a plasma state, and in the case of a gaseous fluid, possibly into a vacuum state. The qualities of the fluid in the boundary layer excited by the electromagnetic radiation, differing from the qualities of the fluid outside the boundary layer, are believed to have the ability to direct and at least partially guide, or shield the fluid in motion approaching the boundary layer. Whether these differing qualities of the fluid in the boundary layer actually deflect, reflect, refract or impose a combination of one or more of these and possibly other effects to the molecules of the approaching motive fluid, is not yet fully understood.

According to one aspect of the invention, there is provided a method for directing a fluid in, wherein at least one curtain of electromagnetic radiation is provided for exciting the fluid at the curtain to form a fluid directional layer in the fluid According to another aspect of the invention, there is provided a device for directing a fluid in motion comprising an electromagnetic radiation emitter adapted to create at least one curtain of electromagnetic radiation for exciting the fluid at said curtain to form a fluid directional layer in the fluid.

Other aspects and features of the invention are given in the claims and in the description of preferred embodiments.

BRIEF DESCRIPTION OF THE DRAWING

Preferred embodiments of the invention will be described in greater detail in the following description with reference to the diagrammatic views on the appended drawing, in which.

DETAILED DESCRIPTION

Figure 1:
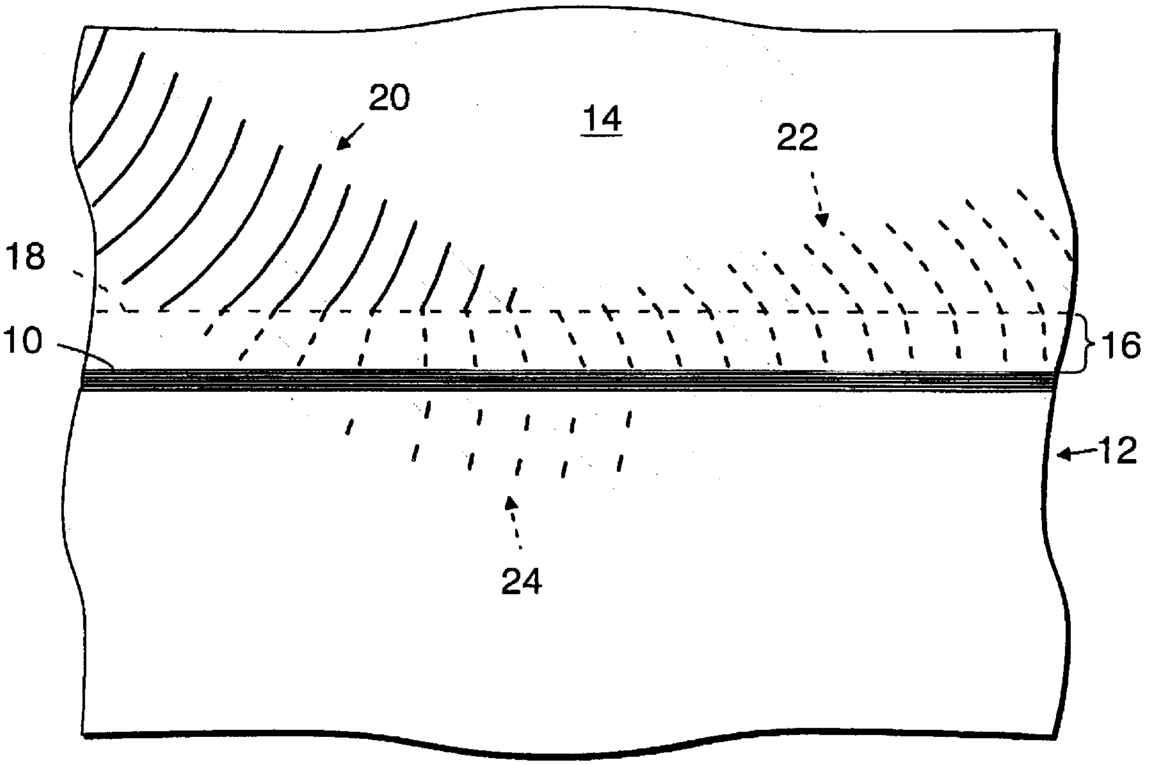
FIG. 1 is a sectional view of a curtain of electromagnetic radiation shielding a fluid in a portion of a space.

In the highly diagrammatic sectional view of FIG. 1 a curtain 10 of collimated and highly energetic electromagnetic radiation is penetrating a space 12. The curtain is imagined as a section of a tubular beam 10 of laser radiation emitted from a tubular emitter device such as 40, FIG. 4 to be later described. A fluid 14 such as air inside tubular beam 10 is believed to be shielded from the space 12 by the tubular beam 10. In case beam 10 is penetrating earth's atmosphere, for example, the surrounding space may be more or less dense air, or vacuum, whereas in the latter instance the fluid 14 possibly can be pumped into the tubular beam through nozzles such as 42, FIG. 5 from radially inside the tubular emitter device 30. The energy of the electromagnetic radiation curtain 10 is such that the fluid 14 in a boundary layer 16 along the curtain 10 will be excited or ionized, or even form a plasma, so as to alter the transmission properties of the fluid when approaching the boundary layer 16. While the electromagnetic radiation is preferably of collimated laser type but other types of electromagnetic radiation such as maser radiation are conceivable.

Generally referenced by 20 in FIG. 1, is a section of an elastic wave formation such as a sound wave formation propagating in the fluid 14 and entering the boundary layer 16 at an angle. It is to be emphasized that the indicated course of influenced wave propagation is purely illustrative and only intended as an attempt to explain that the boundary layer 16 is believed to have a directional, refractive and/or reflective influence on the fluid in motion, capable of at least partially-possibly penetrating waves are indicated by 24-shielding the motive fluid, or possibly partially containing the fluid 14 in the tubular beam 10. The portion of the wave formation influenced by the boundary layer 16 is shown in dashed line indicated by 22. Particularly when interacting with the fluid in motion, the interface 18 between the boundary layer and the fluid 14 is also assumed not to be considered as the indicated sudden transition surface between the excited and nonexcited states of the fluid but as a transition zone with gradually lower level of fluid excitation as a function of increased distance from tubular beam 10. If a vacuum state is created by the electromagnetic radiation in the boundary layer 16 inside the tubular beam 10, the vacuum may of course not be allowed to occupy the full interior of the beam in order not to exclude fluid motion therein; a possibly critical relationship between laser energy and tubular beam interior diameter may be obtained by experiments. When directing sound, for example, it may on the other hand be possible to take advantage of a wide boundary layer for concentrating the sound wave energy to a smaller radius inner tube of the beam to thereby gain a more energetic sound.

The embodiments of a device according to the invention and shown in the respective figures of the drawing have in common a combined laser-sound emitter 40 contained in a housing 30. As shown in the example of FIG. 1, in order to direct or aim laser-sound transmission from the emitter onto a target, such as a land-mine to be destroyed or inactivated by high energy laser-sound radiation, the housing 30 is supported in a gimbal ring 32 to be rotatable around an axis 34. Electric energy for emitter 40 is supplied to housing 30 in a manner known per se via a cable 32 within one of a pair a journal bearings 35, 35 supporting housing 30 for rotation around axis 34. In turn, gimbal ring 32 is supported for rotation around axis 36 via a pair of journal support means 37, 37 to be supported in a mount (not shown) of a vehicle such as a helicopter. As known in the art of aiming, actuators (not shown) arranged to rotate housing 30 and gimbal ring 32 about the respective axes 34, 36, are supplied by incremental angular drive signals from computerized information of target location in order to direct the laser-sound transmission onto the target.

The embodiments shown on the drawing of the laser-sound emitters 40 according to the invention, have all a radially central sound generator 50 and a surrounding laser emitter capable of emitting a tubular beam of discrete or continuous laser radiation enclosing the sound emitted from the sound generator 50. The tubular beam as shown has a circular contour but other closed outlines such as elliptic are possible.

The sound generator 50 may be of any suitable type for generating sound waves adapted for the particular type of application of the laser-sound emitter. When the laser-sound emitter is used for mine disarmament, for example, where the mines are to be inactivated or destroyed by the sound-laser beam, the sound generator is preferably of a piezo-electric type, using an oscillating circuit including a plate condenser having a quartz plate between the condenser plates. The sound generator 50 may preferably also be of a magnetostrictive type using, for example, a nickel rod in a coil supplied by high frequency AC voltage. By appropriate dimensioning, such a sound generator 50 is expected to generate sound of an intensity corresponding to about $10^4$ times the sound intensity of fire from an ordinary artillery cannon at least partially concentrated within the tubular laser beam. In this connection the device can be regarded as a gun not requiring any rounds of ammunition. The sound waves 20 generated this way may also be amplified as needed on increased distance to the target to be destroyed.

The effect of radiation from the integrated laser and ultrasound emitter depends on the combined effect from sound and laser beam. For mine removal, the mine sensors will be influenced to disarm the mines by detonating or not detonating the mines by virtue of vibrations caused by the directional and concentrated ultrasound. The laser radiation is expected to cause melting or burning of plastic mines. It is likely that the sensors are influenced in such way that they cannot function as desired to ignite the mines.

Figure 2:
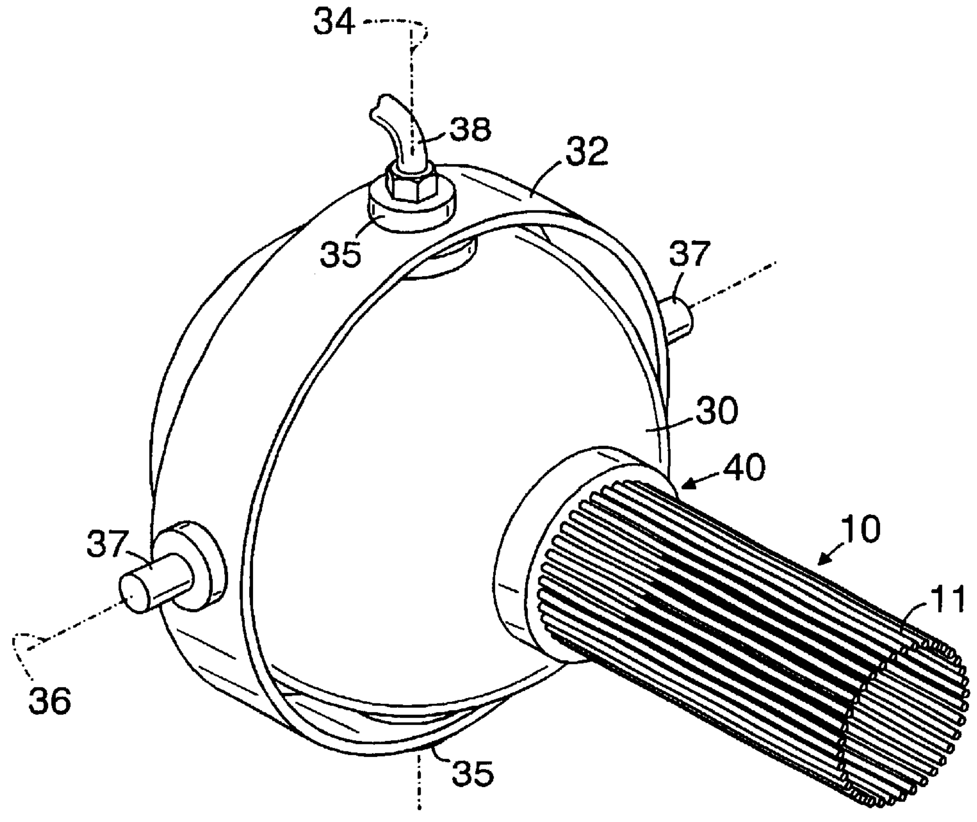
FIG. 2 is a perspective view of a first embodiment of a device according to the invention including a sound generator surrounded by a circular array of discrete laser emitters.
Figure 3:
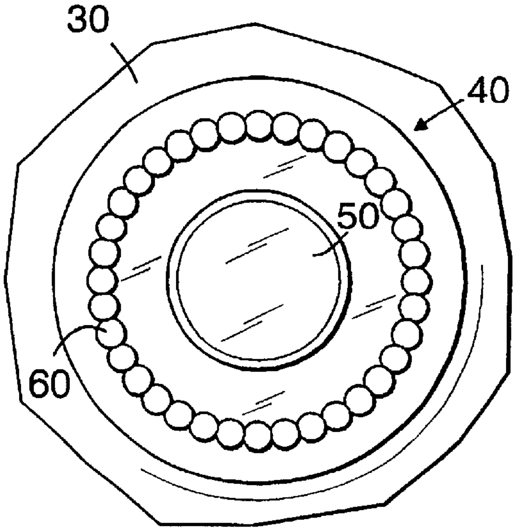
FIG. 3 is a partial front view of the device shown in FIG. 2.

The laser emitters used in the various embodiments of the invention are suitably ruby lasers, which may have a combined power of about 100 kW. Still higher energies may be obtained by using concentrated solar radiation energy as energy input to the laser device. In the embodiment of FIGS. 2 and 3 the tubular beam 10 is composed of a circular array of discrete laser beams or rays 11 from emitters 60. The emitters 60 can be of ruby type having a circular or elliptic reflective cavity (not shown) known in the art. The emitters 60 are further peripherally so closely spaced that the resulting tubular radiation 10 of discrete beams may be considered as a continuous tubular beam. This is also obtained by the fact that the cross sectional area of each ray 11 increases with distance from emitter so that the rays 11 may be overlapping at a distance relatively close to the emitters 60. If the laser rays need to be amplified due to dissipation of energy, two or more emitters can be coupled in series where each additional emitter does not start emitting spontaneously but only when, for example, a ruby unit is excited by flashes from a preceding laser emitter (not shown).

Figure 4:
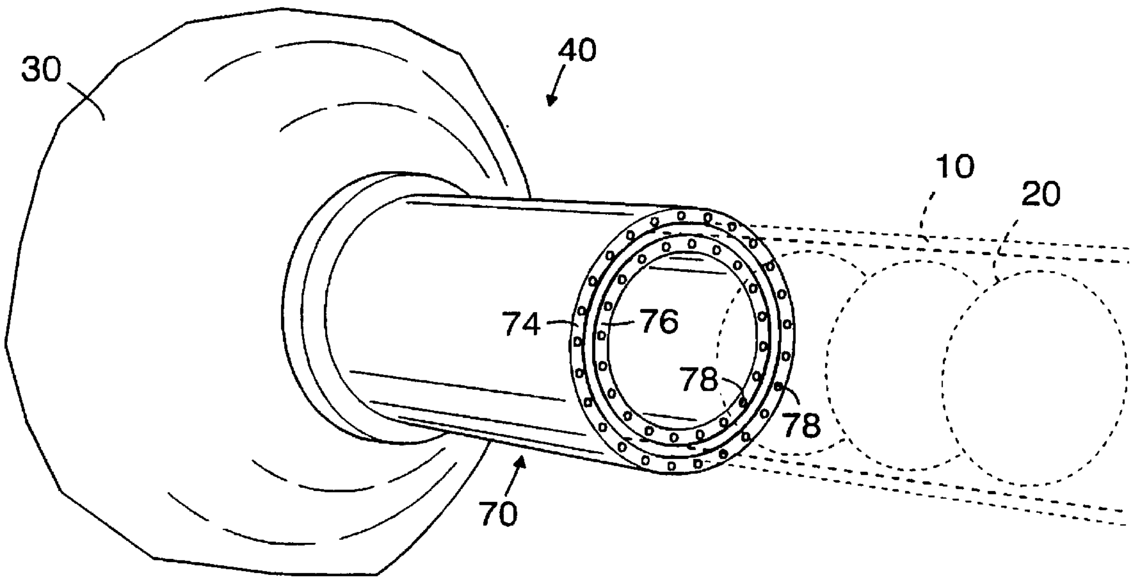
FIG. 4 is a partial perspective view of a second embodiment of a device according to the invention including a sound generator surrounded by a continuous tubular laser emitter.
Figure 5:
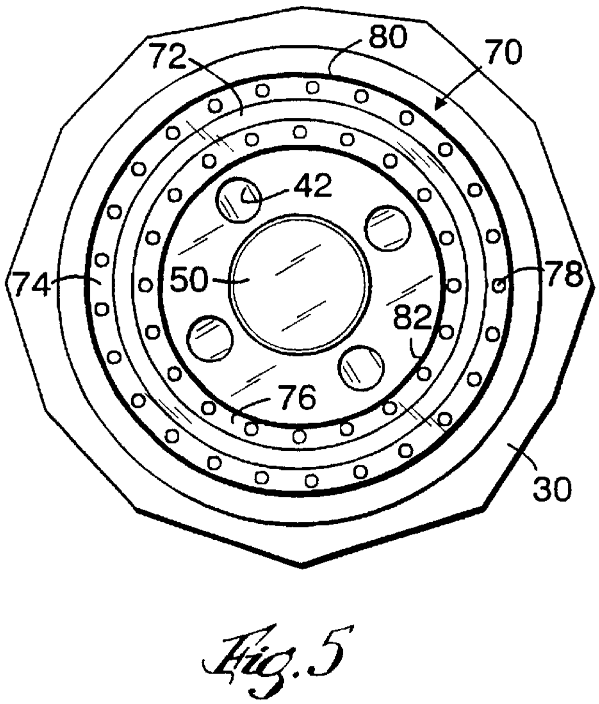
FIG. 5 is a front view of the device shown in FIG. 4.
Figure 6:
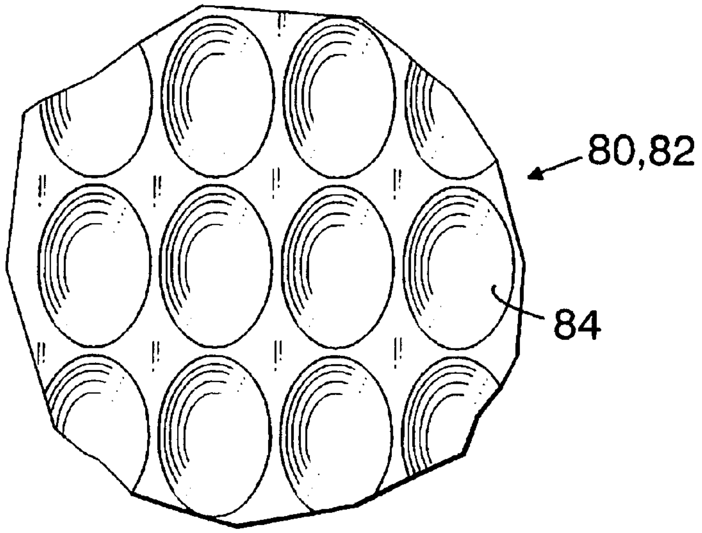
FIG. 6 is a partial front view of an ellipsoidally profiled mirror surface for the inner and outer cylindrical reflective surfaces of the laser emitter shown in FIGS. 4 and 5.

The continuous tubular beam laser emitter 70 according to FIGS. 4–6 is composed of a tubular ruby laser rod 72 concentrically enclosed by a pair of tubular exciting units 74, 76, each unit containing one or more concentric arrays of pump elements or lamps, such as linear lamps 78. The resulting tubular unit is in turn enclosed by concentric concave and convex cylindrical mirrors or reflective surfaces 80 and 82, respectively, defining the reflective cavity for the tubular beam laser emitter 70. As shown in FIG. 6, the reflective surfaces 80, 82 may be smooth surfaces having a dense array of ellipsoidal depressions 84 to stimulate excitation. The components of the laser emitters 60, 70 so far described may be varied in different ways as well known in the art of lasers. The remaining components required to configure the fully functional laser emitters, such as power supplies, sources for pump light, rear cavity mirrors, beam expanders, output couplers, etc., are likewise well known in the art of laser technology. Examples of such components are given, for example, in The Laser Guidebook, Second Edition, by Jeff Hecht, McGraw-Hill, Inc.

An alternative to a continuously working ruby laser for obtaining continuous laser emission is to use neodymium doped garnet crystals of yttrium-aluminum, yttrium-gallium or gadolinium-gallium type. The continuous laser beam can have the ability to illuminate larger areas in shorter time, automatically and at a safe distance when disarming mines. When extremely high energies are required, it can be considered to use a pulse laser combined with sound pulses of the desired power. This type of laser is equipped with a shutter in the space outside the semi-transmission mirror surface at the outlet of the laser emitter. In this case the effect of influencing the ruby to a saturation level of excited ruby atoms (Q value) can be utilized. An additional amplification can be obtained if the ruby portion is composed of pure aluminum oxide combined with normal ruby containing a chrome compound.

Figure 7:
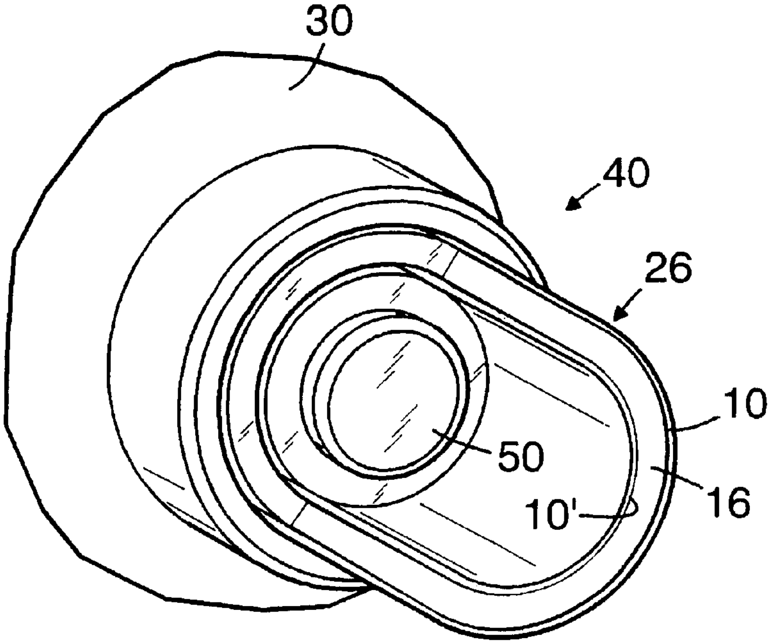
FIG. 7 is a partial perspective view of a device according to the invention including a sound generator and a pair of concentric continuous tubular laser emitters defining a tubular space between the concentric tubular rays of emission from the emitters.
Figure 8:
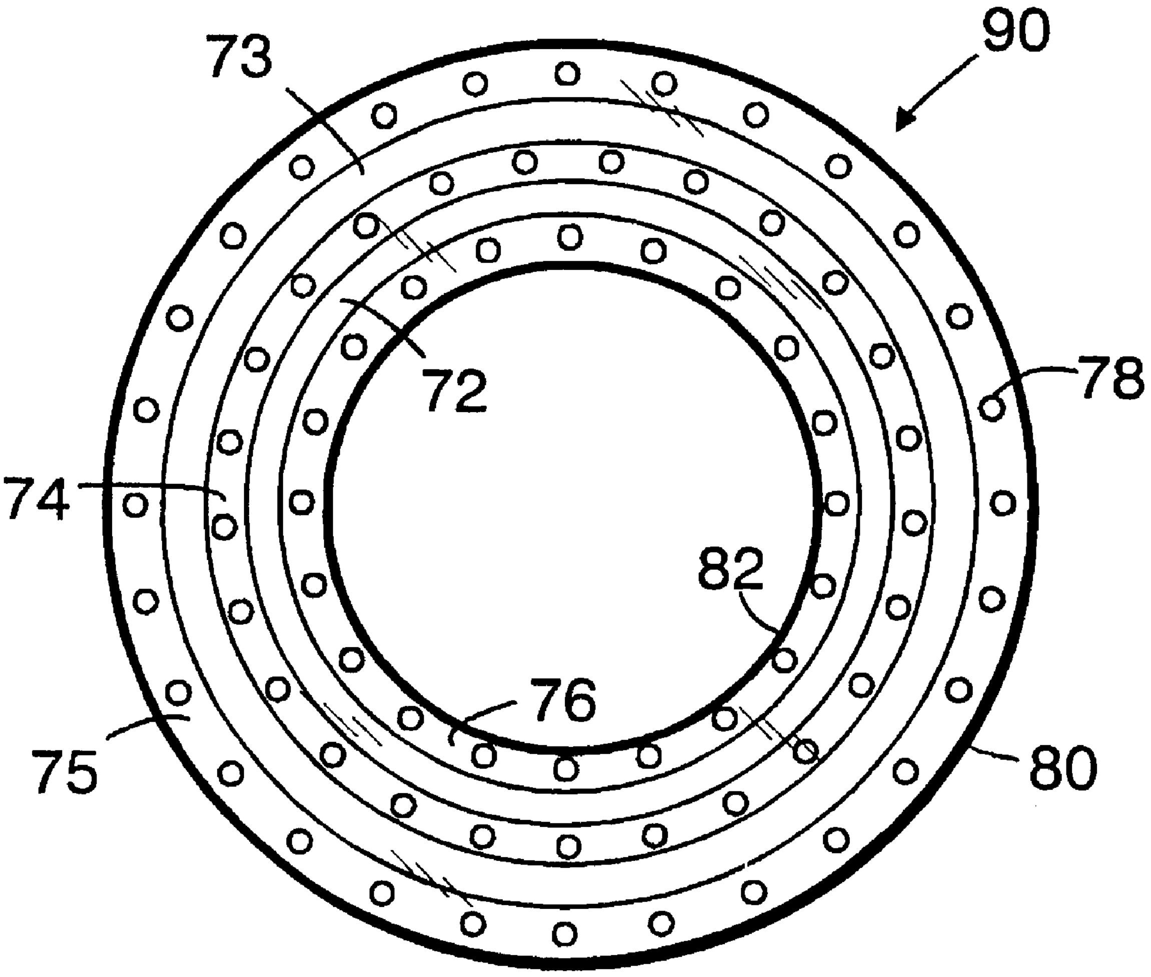
FIG. 8 is a front view of a continuous concentric dual-beam laser emitter.

FIG. 7 shows an example illustrating the possibility of forming the boundary layer 16 between a pair of curtains 10, 10' of laser radiation to possibly enhance the fluid directional properties of the excited boundary layer. More precisely, the fluid in the space between a pair of concentric tubular laser beams 10, 10' is excited by the beams to form a plasma or vacuum state. Each of the emitters for forming the concentric tubular beams 10, 10' could be of the types described in connection with FIGS. 2 and 4. To form an integral continuous dual-beam emitter 90, as shown in FIG. 8, the emitter of FIG. 4 is supplemented with an additional outer pair of a respective concentric tubular ruby 73 and exiting unit 75.

Following the foregoing assumptions of the fluid directional properties of high-energy coherent electromagnetic radiation, there are numerous conceivable applications which could utilize the principles of the invention. While the devices according to the preferred embodiments of the invention described in the foregoing and shown on the drawing are limited to enclosing and directing ultrasound waves, many other applications are imaginable. Sound wave applications, for example, may include the entire spectrum including infra, audio and ultra sound frequencies. High energy concentrated sound waves may further be used for a multitude of penetrating (solid materials etc.) and propelling (rotors etc.) purposes. For containment purposes, it may further also be at least partially possible to direct a static fluid, i.e. a fluid in a state of low molecular motion, to be contained in an enclosure formed by an appropriate curtain configuration. Other applications such as fluid transport in vacuum, although yet to be verified, are also imaginable. It is also conceivable that combined elastic wave and electromagnetic radiation may have useful effects in other 'non-viscous' or viscous fluids such as water-highly viscous fluids up to and including a glass state are not necessarily excluded. The scope of protection is defined in the appended claims.

What is claimed is:

1. A method for directing a fluid (14) in motion (20) by providing at least one curtain (10, 10') of electromagnetic radiation surrounding the fluid in motion, for exciting the fluid at said curtain to form a fluid directional layer in the fluid, and generating said motion in the fluid as wave propagation (20) in the fluid inside the curtain surrounding the fluid in motion.

2. The method of claim 1, wherein said electromagnetic radiation is coherent electromagnetic radiation.

3. The method of claim 1, wherein said electromagnetic radiation is laser radiation.

4. The method of claim 1, wherein said electromagnetic radiation is maser radiation.

5. The method of claim 1, comprising forming mutually spaced curtains (10, 10') of said electromagnetic radiation.

6. The method of claim 1, wherein the exciting of the fluid comprises ionization.

7. The method of claim 1, wherein the exciting of the fluid comprises creating a vacuum in said layer (16) in the fluid.

8. A device for directing a fluid in motion comprising an electromagnetic radiation emitter (60, 70, 90) adapted to create at least one curtain (10, 10') of electromagnetic radiation surrounding the fluid in motion, for exciting the fluid at said curtain to form a fluid directional layer in the fluid, and an elastic wave generator (50) located inside said emitter (60, 70, 90) for creating said motion.

9. The device of claim 8, wherein said emitter is comprised of an array of laser emitters (60) for emitting the tubular beam (10) of radiation.

10. The device of claim 8, wherein said emitter is comprised of a continuous tubular beam laser emitter (70, 90).

11. The device of claim 10, wherein said emitter (70) is comprised of a tubular reflective cavity.

12. The device of claim 11, wherein said tubular reflective cavity is comprised of a tubular ruby rod (72) enclosed by concentric exciting units (74, 76).

13. The device of claim 11, wherein said tubular reflective cavity is comprised of a pair of concentric tubular ruby rods (72, 73) enclosed and separated by concentric exciting units (74,75,76).

14. The device of claim 8, wherein said elastic wave generator is comprised of an ultrasound generator (50).

* * * * *